United States Patent [19]

Pyles

[11] 3,894,201

[45] July 8, 1975

[54] SYSTEM FOR DYNAMIC AND STATIC MUTING

[75] Inventor: Gerald Dee Pyles, Indianapolis, Ind.

[73] Assignee: RCA Corporation, New York, N.Y.

[22] Filed: May 31, 1974

[21] Appl. No.: 475,139

[52] U.S. Cl. ...................... 179/100.4 ST; 179/1 GQ

[51] Int. Cl. ............................................. G11b 3/00

[58] Field of Search ... 179/1 GQ, 15 BT, 100.1 TD, 179/100.4 ST; 329/122

[56] References Cited

UNITED STATES PATENTS

| | | | |
|---|---|---|---|
| 3,209,271 | 9/1965 | Smith | 329/122 |
| 3,337,813 | 8/1967 | Graeve | 331/25 |
| 3,564,434 | 2/1971 | Camenzind et al. | 329/122 |
| 3,686,471 | 8/1972 | Takahashi | 179/100.4 ST |

*Primary Examiner*—Vincent P. Canney
*Attorney, Agent, or Firm*—E. M. Whitacre; T. R. Farino, Jr.

[57] ABSTRACT

A system for providing dynamic and static muting of the subchannel amplifier circuit in a four-channel record demodulator by means of an R-C comparator network which couples and compares the frequency and phase of the subchannel output to a synchronized signal from a phase-locked loop oscillator circuit. The comparator network generates an error signal when the frequency and phase of the compared signals are not synchronized, which error signal biases a field effect transistor into conduction, thereby shunting the subchannel information from the audio output.

13 Claims, 2 Drawing Figures

SYSTEM FOR DYNAMIC AND STATIC MUTING

Figure 1:
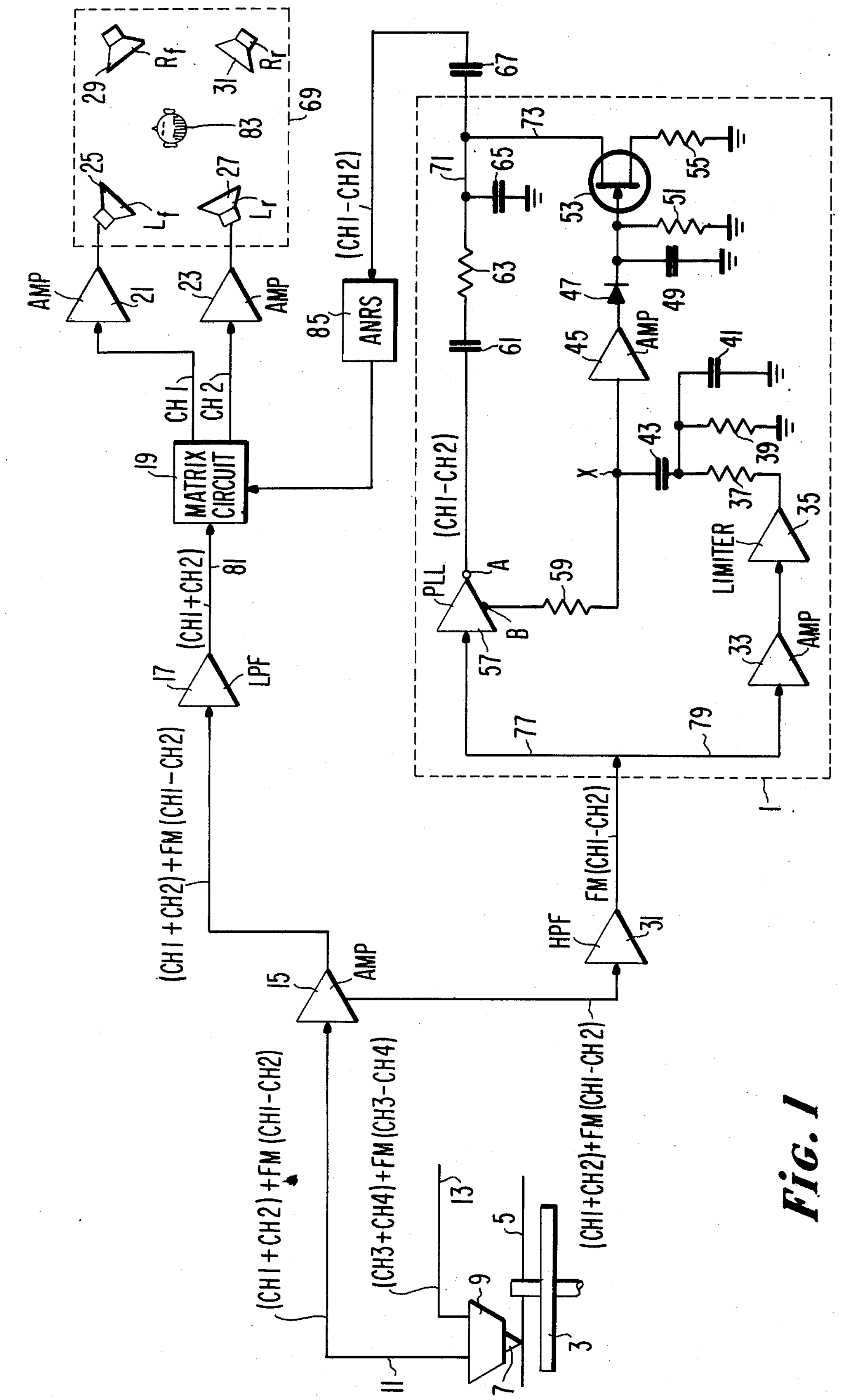

The present invention is concerned with four-channel record playback and, in particular, with apparatus for providing dynamic muting of a subchannel amplifier circuit to prevent the distortion and noise caused by momentary and spurious disruptions in the subchannel signal of a discrete four-channel record during the demodulation process. The apparatus further provides static or constant muting when the subchannel carrier is absent, i.e., during the record change process, idle condition of the playback system or during conventional stereo/mono playback.

Recently, with the advent of four-channel discs, a major concern regarding the feasibility of such four-channel discs has been the requirement for compatibility with the conventional two-channel stereo disc set-up. This compatibility concern manifested itself in two distinct ways: reproduction of a two-channel stereo disc on a four-channel playback system and reproduction of a four-channel disc on a two-channel playback system. The problem of compatibility was overcome in the current commercial system by converting the four-channel signals into sum and difference signals, the sum signals being recorded in a conventional 45–45 groove. In the currently employed four-channel discrete record system, the four signal channels (CH1, CH2, CH3, CH4) are arranged in the order left-front ($L_f$), left-rear ($L_r$), right-front ($R_f$) and right-rear ($R_r$). The general case represented by numbered channel designations will be referred to hereafter. The difference signals are phase and frequency modulated upon a superaudible subcarrier and superimposed on the sum signals in the same groove. Upon playback with a four-channel system, the modulated difference signals are detected after which mixing circuitry performs additive and subtractive computations to reproduce the four original signals. When a four-channel disc is played on a conventional two-channel sterophonic player, only the sum signal components of the audio frequency range, representative of total left and total right signals, are reproduced, thereby allowing for reproduction of all the recorded signal sources. When a two-channel stereo disc is played on a four-channel playback system, reproduction of the total recorded information is achieved as the left and right sound source signals are recorded in the conventional 45–45 groove. However, when a two-channel stereo disc is being played on a playback system having a four-channel capacity, the two superaudible subcarrier demodulation circuits are not supplied with playback information. As such, excessive noise may be generated into the sound reproducing system.

Also, since the difference signals (CH1 − CH2) and (CH3 − CH4) in the four-channel discrete system are recorded in a frequency range from 20KHz to 45KHz, wavelengths result which are less than those involved with conventional discs; hence, the necessity of taking additional precautions against noise as well as for reduction of demodulated signal crosstalk distortion arising from pickup cartridge crosstalk. In the currently employed four-channel discrete record system, an automatic noise reduction system (ANRS) was adopted to help solve this problem associated with the difference signal path. ANRS consists of a compressor in the cutting system and an expander in the demodulator with the mid-range and high range being controlled separately; compression is 10dB in the mid-range and 15dB in the high range.

Additional problems arise in connection with the short wavelengths associated with the recording of the difference signals in the high frequency range from 20KHz to 45KHz. Due to the short wavelength of the signal to be recorded, there are instances where the desired signal is not imparted to the record disc resulting in intelligence gaps and subsequent loss of the difference signal information. Such signal losses allow for the generation of excessive noise into the sound reproducing system. Additionally, since the difference signal information is recorded in such a high frequency range, the grooves imparted to the record disc are more susceptible to wear upon playback. This wear associated with the record grooves eventually causes the character of the grooves to become unrepresentative of the desired difference signal information.

The present invention is designed to provide an additional noise reducing capability over that provided by ANRS to address the above two sources of noise generation.

In accordance with one aspect of the present invention, a system for dynamically muting the superaudible subcarrier signal information to prevent the distortion and noise caused by the momentary and spurious disruption in the subchannel during the demodulation process is arranged to attenuate the audible disturbances from the subchannel FM detector output for the short periods when the spurious erratic disturbances are present.

In accordance with another aspect of the present invention, a system for statically muting the superaudible subcarrier channel is arranged to provide constant muting when the subchannel carrier is absent, i.e., during conventional stereo/mono playback, idle condition, record change process, etc.

The various aspects of the present invention will be better understood by reference to the following description in connection with the accompanying drawing, in which:

FIG. 1 illustrates, in block diagram form, a portion of a system for reproducing multichannel sound from a record disc medium having at least a main audio signal channel and a superaudible modulated subcarrier signal channel employing circuitry consisting of a phase-locked loop, an R-C comparator network, and a field effect transistor for dynamic and static muting of the superaudible subcarrier signal channel.

Figure 2:
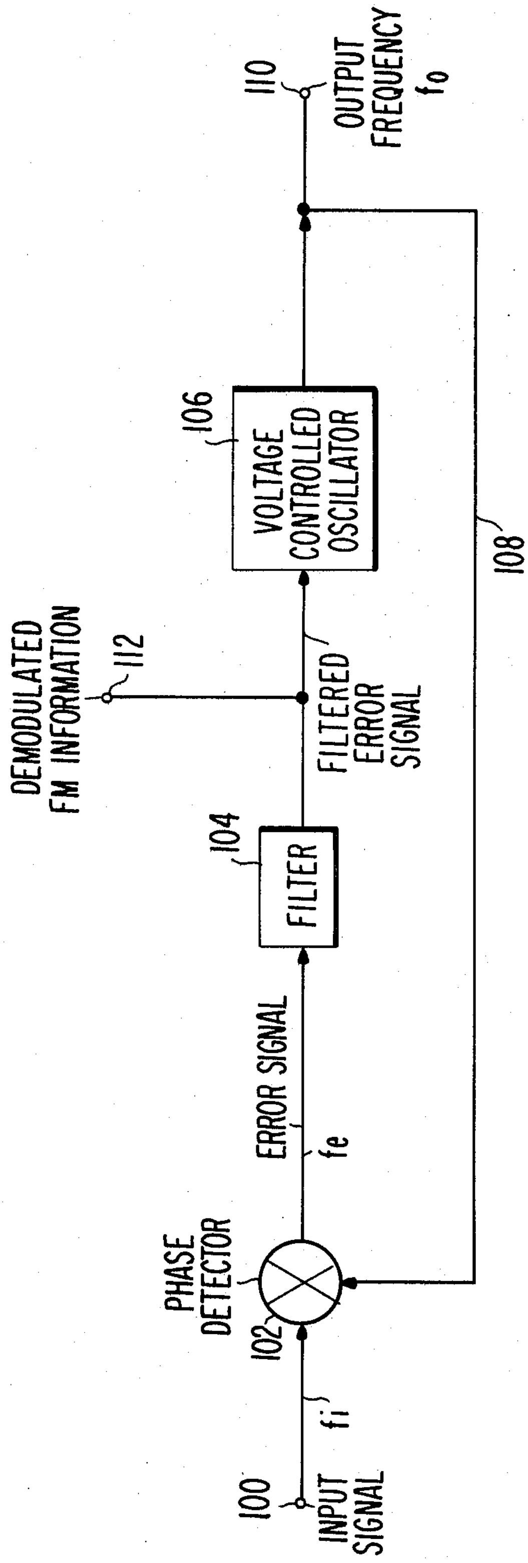

FIG. 2 illustrates, in block diagram form, the components of a phase-locked loop for muting the superaudible subcarrier signal channel by maintaining synchronization between the voltage-controlled output oscillator signal and the superaudible modulated subcarrier input signal for predetermined noise limitations in the input signal and by exhibiting a lack of synchronization when these predetermined noise limitations are exceeded.

In the system of FIG. 1, multichannel sound signals, (CH1 + CH2), FM(CH1 − CH2), (CH3 + CH4) and FM(CH3 − CH4) are reproduced from the groove walls of a disc 5 by means of a stylus 7 of a pick-up cartridge 9. Signal channel 11 couples the sound signals (CH1 + CH2) and FM(CH1 − CH2) from one wall of a record groove of disc 5 to amplifier 15 which in turn couples these signals to demodulation, muting, matrixing and sound reproducing means of the system shown in FIG. 1. Signal channel 13 couples sound signals (CH3 + CH4) and FM(CH3 − CH4) from the remaining wall of a record groove of disc 5 to an identical system (not shown) as illustrated in connection with signal channel 11 in FIG. 1.

Signal processing channel 1 comprises a phase-locked loop detector 57 which couples the input signal FM(CH1 − CH2) to a signal comparison point "X" through a resistor 59. Phase-locked loop detector 57 also demodulates input signal FM(CH1 − CH2) to yield an audio signal (CH1 − CH2) which is coupled to a de-emphasis network comprised of the combination of resistor 63 and capacitor 65 by coupling capacitor 61. De-emphasis signal (CH1 − CH2) is then coupled to ANRS 85 by means of coupling capacitor 67.

Signal processing channel 1 further comprises an amplifier 33 and limiter 35 for coupling the input signal FM(CH1 − CH2) to signal comparison point X by means of a waveform adjusting network comprised of resistors 37 and 39 and capacitors 41 and 43. The resultant signal from comparator point X is coupled to a field effect transistor (FET) 53 by means of an amplifier 45, a diode 47 and the storage-discharge network made up of capacitor 49 and resistor 51. Resistor 55 is coupled to the gate of FET 53 whose main channel path is coupled to output signal path 71. Capacitor 67 couples demodulated output signal (CH1 − CH2) to matrix 19. Audio output signal CH2, which is substantially representative of left-rear sound source information, is coupled to speaker 27 of sound reproducing system 69 by means of amplifier 23. Sound reproducing system 69 comprises, for example, loudspeakers 25, 27, 29, and 31 disposed in the four corners of a listening area.

FIG. 2 illustrates in block diagram form the components of phase-locked loop detector 57 shown in FIG. 1. As shown in FIG. 2, a phase and/or frequency modulated input signal $f_i$ is fed to a phase detector 102 via terminal 100. Filter 104 filters and couples the phase detector error signal to a voltage controlled oscillator (VCO) 106. VCO 106 generates, via output terminal 110, an output frequency $f_o$ which is coupled to phase detector 102 by means of feedback circuit path 108. Terminal 112 provides demodulated FM information from the phase-locked loop.

Operation of the embodiment shown in FIG. 1 is as follows. Stylus 7 of pick-up cartridge 9 rides in the groove of the record disc 5 making contact with the groove walls to reproduce the recorded signals. Specifically, the multiplexed signal reproduced from the left wall of the groove consists of the sum signal (CH1 + CH2) and the angle and frequency modulated difference signal FM(CH1 − CH2) superimposed upon the sum signal. Similarly, the multiplexed signal reproduced from the right wall of the groove consists of the sum signal (CH3 + CH4) and the superimposed angle and frequency modulated difference signal FM(CH3 − CH4). Upper frequency limits of the sum signals (CH1 + CH2) and (CH3 + CH4) are typically 15KHz. Center carrier frequencies of the angle and frequency modulated difference signals FM(CH1 − CH2) and FM(CH3 − CH4) are typically 30KHz. The upper frequency limits of their frequency deviations are typically 45KHz. The lower frequency limits are typically 20KHz.

The multiplexed signal [(CH1 + CH2) + FM(CH1 − CH2)09 reproduced from the pick-up cartridge stylus 7 is supplied to amplifier 15 by means of signal channel 11 where it is amplified and split into two identical components. This multiplexed signal is then supplied to filter 17. Filter 17 is of the low-pass type and attenuates the high frequency angle modulated difference signal FM(CH1 − CH2) while passing the sum signal (CH1 + CH2). The sum signal (CH1 + CH2) filtered through the low-pass filter 17 is supplied to a matrix circuit 19.

The amplified multiplexed signal [(CH1 + CH2) + FM(CH1 − CH2)] is supplied to filter 31 which attenuates the low frequency sum signal (CH1 + CH2) and passes the high frequency angle and frequency modulated difference signal FM(CH1 − CH2). The difference signal FM(CH1 − CH2) filtered through the high-pass filter 31 is supplied to signal processing channel 1.

Difference signal FM(CH1 − CH2) is supplied to phase-locked loop detector 57. The operation of phase-locked loop detector 57 may be better understood by reference to FIG. 2.

Difference signal FM(CH1 − CH2) is supplied to phase detector 102. The output signal $f_o$ of voltage controlled oscillator 106 is also supplied to phase detector 102 via feedback path 108. Phase detector 102 compares the phase of output signal $f_o$ to the phase of the input difference signal FM(CH1 − CH2). The difference from a quadrature relationship, if any, causes an error signal $f_e$ to be generated. This error signal $f_e$ is coupled to filter 104 where the sum component is filtered out and only the low frequency difference component is allowed to pass to output terminal 112 and voltage controlled oscillator 106. The filtered error signal is applied to the control input terminal of voltage controlled oscillator 106 with the proper polarity to reduce the phase difference to a reference value. Thus, variations in the voltage controlled oscillator output signal frequency $f_o$ will be corrected to hold the oscillator output frequency $f_o$ substantially identical with the input difference signal FM(CH1 − CH2). For the same reasons, any change in the input difference signal FM(CH1 − CH2) will be tracked by voltage controlled oscillator 106.

Phase-locked loop detector 57 in addition to the output signal correcting and tracking capabilities, also provides a detection and demodulation function. The phase-locked loop accomplishes FM demodulation in a simple manner because the loop is capable of locking the frequency of the voltage controlled oscillator output signal to the frequency of the incoming reference signal, namely, the input difference signal FM(CH1 − CH2). It is this characteristic which permits the phase-locked loop to act as a frequency discriminator. If the input signal is frequency modulated and if the loop bandwidth is selected by means of filter 104 to pass the deviation frequency but reject the carrier frequency, the resulting error voltage applied to the VCO and terminal 112 will be the recovered modulation signal.

This recovered modulation signal (CH1 − CH2) appears at terminal A of phase-locked loop detector (PLL) 57 where it is coupled to the de-emphasis network comprised of resistor 63 and capacitor 65 by means of coupling capacitor 61. This demodulated, de-emphasized difference signal (CH1 − CH2) is then coupled to matrix circuit 19 by means of coupling capacitor 67 and ANRS 85.

The output signal $f_o$ of VCO 106 appears at terminal B of phase-locked loop detector 57. Output signal $f_o$ is coupled to signal comparison point X by means of a shaping network comprised of resistor 59 and capacitor 73.

Difference signal channel FM(CH1 − CH2) from high-pass filter 31 is amplified by amplifier 33 and limited by differential amplifier 35. This amplified and limited difference signal is applied to a shaping network comprised of resistors 37, 39 and capacitor 41 after which it is coupled to comparator point X by means of coupling capacitor 43.

The re-shaped and phase-adjusted waveforms of the output signal from VCO 106 of PLL detector 57 appearing at terminal B and amplified and limited difference signal of path 77 are coupled together at a comparator point X. Here, their phasing and shaping are adjusted to yield a minimum or a cancellation effect as an output at point X when the desired difference signal is reasonably free of spurious amplitude and frequency variations.

When the difference signal FM(CH1 − CH2) contains spurious amplitude and frequency variations and/or excessive FM modulation, signal processing channel 1 operates to attenuate this noisy difference signal from the sound reproducing system 69. Operation of unit 1 is as follows. Voltage controlled oscillator 106 of PLL detector 57 is typically a free-running multivibrator of a certain frequency with a direct current input which can vary its output frequency over a certain range. There is a certain range of input frequencies about the free-running multivibrator frequency within which a phase-locked loop once locked, will remain locked. This range of frequencies is known as the tracking range or lock-in range of the phase-locked loop. This lock-in range is a function of the loop gain, since the phase detector output is bounded and can drive the oscillator only over a certain frequency range and may therefore be adjusted by altering circuit constants in the phase-locked loop. If this range of VCO input frequencies is exceeded, the loop will come out of lock and the VCO output will tend to revert back to its free-running multivibrator frequency.

If the phase-locked loop circuit parameters are adjusted so that the lock-in range is defined in terms of the allowable limit of spurious amplitude variations and excessive FM modulation to be tolerated, then a difference signal with a noise level within this allowable limit will result in a phase-locked loop operation in which lock is maintained with the output signal of VCO 106 in synchronism with the input difference signal FM(CH1 − CH2). As such, the output signal from terminal B of PLL detector 57 is substantially correlated in frequency and phase with the amplified and limited signal of circuit path 79 resulting in a minimum or cancellation effect at point X.

If a difference signal contains noise and erratic frequency deviations which exceed the lock-in range, the loop will come out of lock and the VCO output will tend to revert back to its free-running multivibrator frequency. When this occurs, the output signal of VCO 106 will no longer be maintained in synchronism with the input difference signal FM(CH1 − CH2). The output signal from terminal B of PLL detector 57 will not be correlated in frequency and phase with the amplified and limited signal FM(CH1 − CH2) of circuit path 79. This mismatch in signals will cause an error signal to be developed at comparator point X. This error signal is amplified by amplifier 45 and rectified by diode 47. This amplified and rectified error signal is then coupled to the gate of field effect transistor 53 by means of an R-C network comprised of capacitor 49 and resistor 51 where the error signal is filtered and shaped. The error signal now begins to charge capacitor 49. This increasing potential is transmitted to the gate electrode of field effect transistor 53, which up to this point has been characterized by a high impedance in its main current conducting path (drain-source). As the potential across capacitor 49 continues to increase, the rise in gate potential causes the main current conducting path of FET 53 to decrease in impedance. This decrease in impedance permits attenuation of the demodulated difference signal (CH1 − CH2) of path 71 to ground by means of path 73 and resistor 55 for the short periods when the difference signal contains spurious erratic disturbances. Resistor 51 provides for slow discharge of capacitor 49 during those periods when no error signal is present. Thus, signal processing channel 1 dynamically mutes the subchannel amplifier circuit during the demodulation process to prevent the distortion and noise caused by the momentary and spurious disruption in the subchannel of a discrete four-channel record from reaching the sound reproducing system.

Matrix circuit 19 effects the following matrix operation on sum signal (CH1 + CH2) coupled via circuit path 81 and demodulated difference signal (CH1 − CH2) coupled via circuit path 71:

$\frac{1}{2}[(CH1 + CH2) + (CH1 - CH2)] = CH1$ $\frac{1}{2}[(CH1 + CH2) - (CH1 - CH2)] = CH2$ Thereafter, the first and second channel signals CH1 and CH2 are taken out of the matrix circuit 19 and amplified by amplifiers 21 and 23, respectively. The amplified channel signals CH1 and CH2 are supplied to loudspeakers 25 and 27, respectively, which are respectively placed at the left-front and the left-rear of a listener 83. An identical system as illustrated in connection with signal CH1 and CH2 in FIG. 1 is provided for demodulating, muting, matrixing and coupling signals CH3 and CH4 from the remaining wall of a record groove to loudspeakers 29 and 31, respectively, which are respectively placed at the right-front and right-rear of a listener 83. If a conventional two-channel stereo disc is played back in the four-channel record playback system according to this invention, a left channel signal will be reproduced from loudspeakers 25 and 27 and a right channel signal from loudspeakers 29 and 31.

In accordance with another aspect of the present invention, static muting of the superaudible subcarrier channel is provided for constant muting when the subchannel carrier is absent, i.e., during conventional stereo/mono playback, idle condition, record change process, etc. Under these circumstances, signal processing channel 1 operates in the following manner to provide static muting.

As described above in connection with the dynamic muting operation of signal processing channel 1, there is a certain range of frequencies, known as the lock-in range, about the free-running multivibrator frequency under which a phase-locked loop, once locked, will remain locked. If this range of frequencies is exceeded by the input reference signal or if there is no input reference signal at all, the loop will tend to come out of lock and the VCO output will tend to revert back to its free-running multivibrator frequency.

In the absence of a subchannel carrier, phase-locked loop detector 57 will have no input reference signal with which to maintain lock and the signal output at terminal B will be representative of the free-running multivibrator frequency of VCO 106. In addition, there will be no signal at point X from circuit path 79. As described above in connection with the dynamic muting operation, this condition will prevent a minimum or cancellation effect from taking place and an error signal will be developed at comparator point X. This error signal is amplified and rectified and coupled to the gain of FET 53 where it causes the resistance of the source-drain channel to decrease, thereby attenuating the superaudible subcarrier as described above in connection with the dynamic muting operation.

Although the muting system described in connection with FIG. 1 sets forth apparatus specifically for use in the playback of four-channel phonograph discs, the dynamic and static muting principle is applicable to other situations where a prescribed relationship is necessary between an incoming signal and a reference signal. An example would be an FM multiplex transmission system. Other alternatives or improvements will occur to persons of ordinary skill.

What is claimed is:

1. In a system for reproducing multichannel sound from a record medium having at least a main audio signal channel and a superaudible modulated subcarrier signal channel, a system for providing muting of the subcarrier signal channel comprising:

1. means for recovering from said medium said main audio frequency signal components and superaudible modulated subcarrier signal components;
2. a sound reproducing system;
3. channel filtering means coupled to said recovering means for separating out said main audio frequency signal components from said superaudible modulated subcarrier signal components;
4. a signal processing channel coupled to said filtering means for demodulation of said separated subcarrier signal components and for coupling resultant demodulated subcarrier signal components to said sound reproducing system; and
5. means for muting said signal processing channel comprising:
   a. a phase-locked loop circuit coupled to said filtering means for generating an output signal representative of the output signal of said filtering means when variations in the output signal of said filtering means are within predetermined limits and for generating an output signal independent of the output signal of said filtering means in a first instance when said variations are not within said predetermined limits, and in a second instance when said output signal of said filtering means is substantially absent;
   b. means coupled between said filtering means and said phase-locked loop circuit for comparing the output signals of said filtering means and phase-locked loop circuit and for generating an error signal when said output signals are different, and for providing a cancellation effect when said output signals are the same;
   c. means responsive to said error signal for decoupling said signal processing channel from said sound reproducing system, thereby muting said demodulated subcarrier signal channel; and
6. signal combining means for coupling said main audio frequency signal components and the resultant demodulated subcarrier signal components of said signal processing channel to said sound reproducing system.

2. A muting system according to claim 1 in which said muting means provides dynamic muting in a first instance when said variations in said output signal of said filtering means are not within said predetermined limits and in which said muting means provides static muting in a second instance when said output signal of said filtering means is substantially absent.

3. A muting system according to claim 1 in which said means for decoupling said signal processing channel from said sound reproducing system comprises an active device having a control electrode and a main current conducting path, said active device being responsive to a bias level at said control electrode for providing a variable impedance in said main current path.

4. A muting system according to claim 3 in which said control electrode of said active device is biased by said error signal, said bias rendering said main current conducting path conductive, thereby attenuating said signal processing channel to provide muting of said demodulated subcarrier signal channel.

5. A muting system according to claim 4 in which said active device is a field effect transistor having a gate as a control electrode and a main current conducting path, said transistor being responsive to a bias level at said gate for providing a variable impedance in said main current path.

6. A muting system according to claim 1 in which said comparator means comprises an R-C coupled network adjusted to yield a minimum or cancellation effect when the superaudible modulated subcarrier signal is reasonably free of spurious amplitude and frequency variations and to yield an error signal when said superaudible signal is not free of such spurious variations.

7. A muting system according to claim 1 in which said phase-locked loop circuit comprises a controlled oscillator for generating an output signal, a phase comparator responsive to the output of said main channel filtering means and said controlled oscillator for providing a control signal and loop filtering means for filtering said control signal and for coupling a resultant filtered control signal to said controlled oscillator whose output signal is controlled thereby.

8. A muting system according to claim 7 in which the output signal of said phase-locked loop unrelated to said filtering means output signal is a signal characteristic of the free-running frequency signal of the controlled oscillator.

9. A muting system according to claim 1 in which said signal processing channel comprises demodulation circuitry for demodulating said superaudible high frequency signal components into audio frequency signal components.

10. A muting system according to claim 9 in which said superaudible subcarrier signal components comprise audio information modulated on a 30KHz carrier signal.

11. A muting system according to claim 7 in which said control signal comprises the demodulated superaudible subcarrier audio information.

12. A muting system according to claim 7 in which said controlled oscillator is of the voltage controlled type comprising a multivibrator and means for varying the frequency of oscillation of said multivibrator in response to said control signals.

13. In a system for reproducing multichannel sound from a record medium having at least a main audio signal channel and a superaudible modulated subcarrier signal channel, a system for providing muting of the subcarrier signal channel comprising:

1. means for recovering from said medium said main audio frequency signal components and superaudible modulated subcarrier signal components;
2. a sound reproducing system;
3. channel filtering means coupled to said recovering means for separating out said main audio frequency signal components from said superaudible modulated subcarrier signal components;
4. a signal processing channel coupled to said filtering means for demodulation of said separated subcarrier signal components and for coupling resultant demodulated subcarrier signal components to said sound reproducing system; and
5. means for muting said signal processing channel comprising:
   a. a phase-locked loop circuit coupled to said filtering means for generating an output signal representative of the output signal of said filtering means when variations in the output signal of said filtering means are within predetermined limits and for generating an output signal independent of the output signal of said filtering means when said variations are not within said predetermined limits;
   b. means coupled between said filtering means and said phase-locked loop circuit for comparing the output signals of said filtering means and phase-locked loop circuit and for generating an error signal when said output signals are different, and for providing a cancellation effect when said output signals are the same;
   c. means responsive to said error signal for decoupling said signal processing channel from said sound reproducing system, thereby muting said demodulated subcarrier signal channel; and
6. signal combining means for coupling said main audio frequency signal components and the resultant demodulated subcarrier signal components of said signal processing channel to said sound reproducing system.

* * * * *